United States Patent
Buczynski et al.

(10) Patent No.: US 11,097,645 B2
(45) Date of Patent: Aug. 24, 2021

(54) TIE DOWN ASSEMBLY

(71) Applicant: Illinois Tool Works Inc., Glenview, IL (US)

(72) Inventors: Gregory George Buczynski, Ferndale, MI (US); Zhilin Li, Jiaxin (CN)

(73) Assignee: Illinois Tool Works Inc., Glenview, IL (US)

( * ) Notice: Subject to any disclaimer, the term of this patent is extended or adjusted under 35 U.S.C. 154(b) by 3 days.

(21) Appl. No.: 16/420,442

(22) Filed: May 23, 2019

(65) Prior Publication Data

US 2019/0359112 A1    Nov. 28, 2019

Related U.S. Application Data

(60) Provisional application No. 62/675,804, filed on May 24, 2018.

(51) Int. Cl.
*B60P 7/08* (2006.01)

(52) U.S. Cl.
CPC .................. *B60P 7/0807* (2013.01)

(58) Field of Classification Search
CPC .......... B60P 7/0807; B60P 7/08; F16B 45/00; F16G 11/146
USPC ......................................... 410/106, 110, 116
See application file for complete search history.

(56) References Cited

U.S. PATENT DOCUMENTS

| | | | | |
|---|---|---|---|---|
| 5,774,948 A | * | 7/1998 | Petschke | B60P 7/0807 410/101 |
| 5,961,241 A | * | 10/1999 | Haker | B60P 7/0807 403/155 |
| 6,213,696 B1 | * | 4/2001 | Austin | B60P 7/0807 410/101 |
| 2009/0169321 A1 | * | 7/2009 | Flannigan | B60P 7/0807 410/101 |
| 2012/0174344 A1 | * | 7/2012 | Niklas | B60P 7/0807 24/265 CD |

FOREIGN PATENT DOCUMENTS

| | | |
|---|---|---|
| DE | 3301960 A1 | 8/1984 |
| DE | 20 2012 006770 U1 | 8/2012 |
| WO | 01/72548 A1 | 10/2001 |
| WO | 2012/152911 A1 | 11/2012 |

OTHER PUBLICATIONS

International Search Report and Written Opinion for PCT/US2019/033903, dated Aug. 9, 2019. (15 pages).

* cited by examiner

*Primary Examiner* — Stephen T Gordon
(74) *Attorney, Agent, or Firm* — Quarles & Brady LLP

(57) ABSTRACT

A tie down assembly includes a clasp, a ring that is rotatably coupled to the clasp, and a support coupler that is coupled to the ring. The support coupler frictionally controls rotation of the ring with respect to the clasp.

20 Claims, 14 Drawing Sheets

TIE DOWN ASSEMBLY

RELATED APPLICATIONS

This application is based on, claims priority to, and incorporates herein by reference in its entirety U.S. Provisional Application No. 62/675,804, filed on May 24, 2018, and entitled "Tie Down Assembly".

FIELD OF EMBODIMENTS OF THE DISCLOSURE

Embodiments of the present disclosure generally relate to tie down assemblies, which may be used to secure components, such as luggage, to a structure, such as an interior portion of a trunk or roof of a vehicle.

BACKGROUND

Tie downs are used to secure components, such as luggage, to a structure, such as an interior portion of a trunk, a rear portion of an interior cabin, a closed or open cargo area, or a roof of a vehicle. Typically, a tie down includes a metal clasp that couples to a metal ring. The metal clasp includes a flat support plate that is secured to a portion of a structure, such as through a bolt. The support plate also includes a sleeve defining an open-ended channel. A portion of the ring is rotatably secured within the channel of the sleeve, thereby allowing the ring to rotate relative to the clasp.

In order to secure a component to the tie down, a strap, string, webbing or the like is tied or otherwise secured to the ring. For example, a strap of a piece of luggage may be tied or looped to the ring. Because the clasp is secured to the structure, the component is securely coupled to the structure by the tie down.

As indicated, a typical tie down is formed entirely of metal. That is, both the clasp and the ring are formed of metal. It has been found that manufacturing variations in the ring and the clasp may cause the ring to either rotate too freely or to rotate upon exertion of excessive effort. That is, a particular friction between the ring and the clasp may be desired, but variations in the metal clasp and the metal ring may result in too little or too much friction therebetween. Consequently, the metal ring may rattle or seize up in relation to the clasp.

In light of the above deficiencies, it would be desirable to provide a tie down that provides increased rotational control and eliminates, minimizes, or otherwise reduces rattling of the ring relative to the clasp.

SUMMARY OF EMBODIMENTS OF THE DISCLOSURE

A need exists for a tie down assembly that frictionally controls rotation of a ring in relation to a clasp. Further, a need exists for a tie down assembly that provides consistent rotational operation despite manufacturing variations in clasps and rings. Also, a need exists for a tie down assembly that eliminates, minimizes, or reduces undesired noise (for example, rattling).

With those needs in mind, certain embodiments of the present disclosure provide a tie down assembly that includes a clasp, a ring rotatably coupled to the clasp, and a support coupler that is coupled to the ring. The support coupler frictionally controls rotation of the ring with respect to the clasp.

In at least one embodiment, the clasp and the ring are formed of one or more metals, and the support coupler is formed of material that is softer than the clasp and the ring. For example, the material may be a plastic.

The clasp may include a securing plate, and lateral prongs extending from the securing plate. The lateral prongs are separated by a gap. Each of the lateral prongs defines a channel through which a portion of the ring is positioned. A portion of the support coupler couples to the ring within the gap. The support coupler may include a base that underlies the securing plate.

In at least one embodiment, the support coupler includes a ring engagement member that frictionally couples to a portion of the ring. The ring engagement member may include resilient clips extending from a base. The ring engagement member may include a C-shaped sleeve including an arcuate wall and an open end. In at least one embodiment, a base of the support coupler may be provided between aligned panels of a securing plate of the clasp.

In at least one embodiment, the support coupler includes a lower cap underneath the clasp, and an upper cap over the clasp. The lower cap may include a first ring engagement member, and the upper cap may include a second ring engagement member. The first ring engagement member may cooperate with the second ring engagement member to frictionally and rotationally trap a portion of the ring therebetween.

Certain embodiments of the present disclosure provide a tie down assembly that includes a clasp including a securing plate, and lateral prongs extending from the securing plate. The lateral prongs are separated by a gap. Each of the lateral prongs defines a channel. A ring is rotatably coupled to the clasp. A first portion of the ring is positioned within the channels of the lateral prongs. The clasp and the ring are formed of one or more metals. A support coupler is coupled to the ring within the gap. The support coupler is formed of plastic. The support coupler frictionally controls rotation of the ring with respect to the clasp. The support coupler includes at least one ring engagement member that frictionally couples to a second portion of the ring.

In at least one embodiment, the support coupler includes a base that underlies the securing plate. At least one of the ring engagement member may include resilient clips extending from a base. At least one of the ring engagement member may include a C-shaped sleeve including an arcuate wall and an open end. In at least one embodiment, a base of the support coupler is provided between aligned panels of a securing plate of the clasp.

In at least one embodiment, the support coupler includes a lower cap underneath the clasp, and an upper cap over the clasp. The lower cap may include a first ring engagement member, and the upper cap may include a second ring engagement member. The first ring engagement member may cooperate with the second ring engagement member to frictionally and rotationally trap a portion of the ring therebetween.

Certain embodiments of the present disclosure provide a tie down assembly that includes a clasp, a ring rotatably coupled to the clasp, and a support coupler that is coupled to the ring. The support coupler includes a lower cap underneath the clasp and an upper cap over the clasp. The lower cap comprises two ring engagement members. The ring engagement members include an arcuate channel to receive a portion of the ring, wherein the arcuate channel further has a plurality of protrusions extending radially around the arcuate channel to engage the ring. The support coupler frictionally controls rotation of the ring with respect to the clasp.

DETAILED DESCRIPTION OF EMBODIMENTS OF THE DISCLOSURE

Certain embodiments of the present disclosure provide a tie down assembly that includes a clasp, a ring rotatably coupled to the clasp, and a friction-controlling support coupler that couples to the ring. The support coupler may be secured to a portion of the clasp. In at least one embodiment, the clasp includes spaced-apart prongs, each of which defines a channel therethrough. A portion of the ring is rotatably secured within the channels of the prongs. The support coupler includes a ring engagement member that extends between the prongs and securely couples to the ring between the prongs. The ring engagement member frictionally controls rotation of the ring with respect to the clasp.

The support coupler is formed of a softer material than the ring and the clasp. In at least one embodiment, the support coupler is formed of a plastic, while the ring and the clasp are formed of one or more metals. In at least one other embodiment, the support coupler may be formed of an elastomeric material, such as rubber. Optionally, the support coupler may be formed of other types of materials that may be used to control friction, as described herein.

Figure 1:
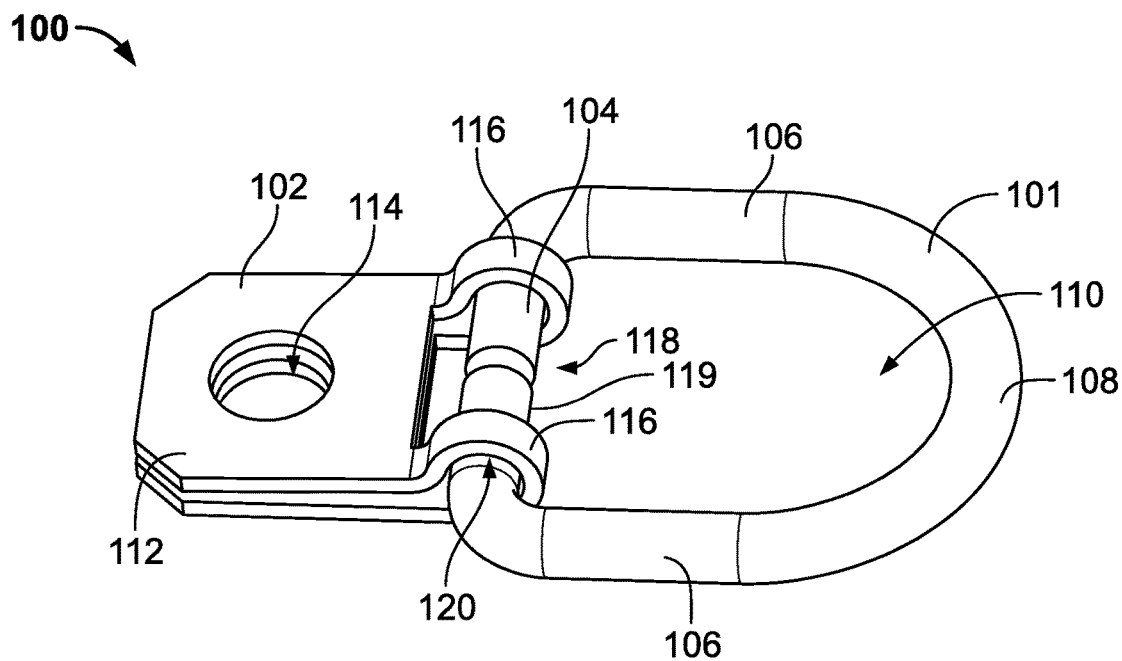
FIG. 1 illustrates a perspective top view of one embodiment of a ring rotatably secured to a clasp.

FIG. 1 illustrates a tie down assembly 100 that includes a ring 101 rotatably secured to a clasp 102, according to an embodiment of the present disclosure. The ring 101 and the clasp 102 may be formed of one or more metals. The ring 101 includes a proximal tubular pivot beam 104 connected to lateral beams 106, which are, in turn, connected to a distal outwardly-bowed tie beam 108. An opening 110 is defined between a contiguous boundary formed by the pivot beam 104, the lateral beams 106, and the tie beam 108. The ring 101 may be formed in various other shapes than shown. For example, the ring 101 may be circular or square shaped.

The clasp 102 includes a securing plate 112 having a through-hole 114 formed therethrough. The securing plate 112 may include one or more panels, for example. Lateral prongs 116 extend outwardly from the securing plate 112. The prongs 116 are separated by a space or gap 118. Each prong 116 defines a channel 120 through which a first portion of the pivot beam 104 is positioned. The pivot beam 104 is rotatably coupled to the clasp 102 through the prongs 116. As shown, the clasp 102 may be formed from a single piece of metal that is folded upon itself to form the prongs 116.

Figure 2:
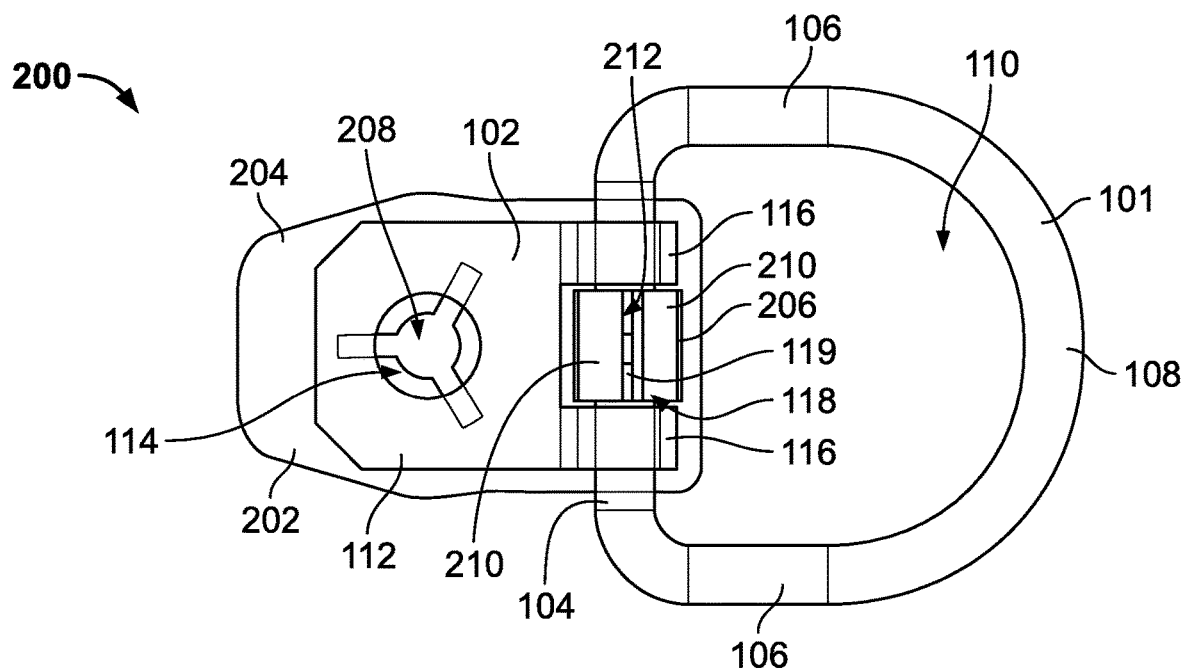
FIG. 2 illustrates a top plan view of another embodiment of a tie down assembly.
Figure 3:
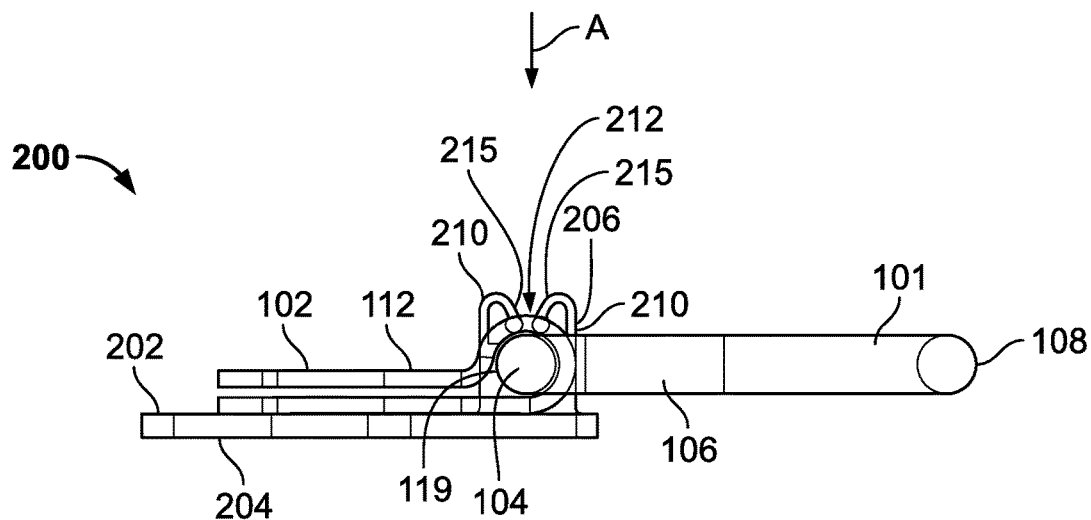
FIG. 3 illustrates a lateral view of the tie down assembly of FIG. 2.

FIGS. 2 and 3 illustrate another embodiment of a tie down assembly 200, which includes some similar structural elements as noted in connection with FIG. 1 above. The tie down assembly 200 includes the ring 101, the clasp 102, and a friction-controlling support coupler 202. The support coupler 202 is formed of a different material than the ring 101 and the clasp 102. In at least one embodiment, the support coupler 202 is formed of a plastic. Alternatively, the support coupler 202 may be formed of an elastomeric material.

The support coupler 202 includes a planar base 204 that underlies the securing plate 112 of the clasp 102. A ring engagement member 206 extends upwardly from the support coupler 202 within the gap 118 between the prongs 116 of the clasp 102. The ring engagement member 206 frictionally couples to a central section 119 of the pivot beam 104 that extends between the prongs 116.

The base 204 includes a through-hole 208 that is aligned with the through-hole 114 of the securing plate 112. The aligned through-holes 208, 114 are configured to receive a shaft of a fastener (not shown), such as a bolt or screw, in order to securely fix the tie down assembly 200 to a structure, such as an interior portion of a trunk, a rear portion of an interior cabin, a closed or open cargo area, or roof of a vehicle. Because the base 204 underlies the clasp 102, the base 204 of the tie down assembly 200 directly contacts the structure, instead of the clasp 102.

The ring engagement member 206 includes resilient clips 210 separated by a space 212. The resilient clips 210 extend upwardly from the base 204 and frictionally engage a second portion (such as front, rear, and upper portions of the central section 119) of the pivot beam 104. In order to secure the ring 101 to the clips 210, the central section 119 of the pivot beam 104 is downwardly urged between the clips 210 in the direction of arrow A (or, optionally, the support coupler 202 is upwardly urged into the central section in an opposite direction). As the central section 119 is urged into and between the clips 210, the clips 210 outwardly deflect until the central section 119 passes underneath retaining arms 215, at which point the clips 210 deflect back to their at-rest positions to frictionally and rotationally trap the central section 119 between the clips 210. In this manner, the resilient clips 210, which may be formed of plastic, frictionally control rotation of the ring 101. That is, the ring engagement member 206, which includes the clips 210, provides increased rotational control of the ring 101 in relation to the clasp 102, as the ring engagement member 206 is softer and more pliant than the ring 101 and the clasp 102.

The softer material of the support coupler 202, including the ring engagement member 206, frictionally engages the central section 119 of the pivot beam 104 to dampen rotational motion of the ring 101. As such, the ring engagement member 206 acts akin to a brake to frictionally control rotational motion of the ring 101.

Figure 4:
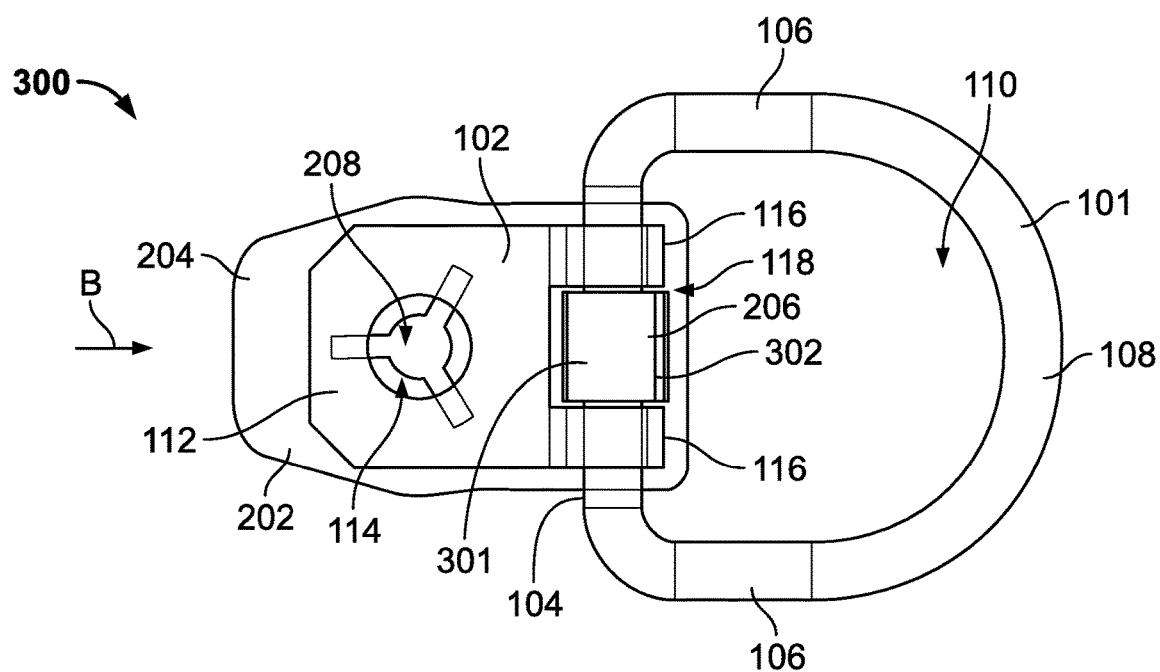
FIG. 4 illustrates a top plan view of still another embodiment of tie down assembly.
Figure 5:
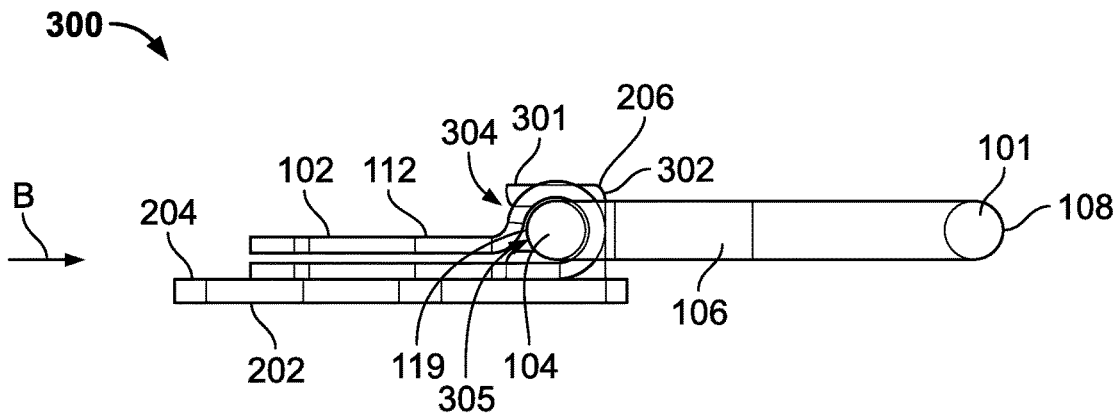
FIG. 5 illustrates a lateral view of the tie down assembly of FIG. 4.

Referring to FIGS. 4 and 5, another embodiment of a tie down assembly 300 is shown, which is similar to that shown in FIGS. 2 and 3. In the present embodiment, the ring engagement member 206 of the support coupler 202 includes a C-shaped sleeve 301 having an arcuate wall 302 that wraps around an underside, front portion, and top portion of the central section 119 of the ring 101. The sleeve 301 includes an open rear end 304.

In order to secure the ring 101 to the sleeve 301, the central section 119 of the pivot beam 104 is pulled into the open rear end 304 in the direction of arrow B (or the sleeve 301 is pulled into the central section 119 in an opposite direction). As the central section 119 is urged into a channel 305 defined by the wall 302, the wall 302 deflects to allow the central section 119 to pass into the channel 305. As the central section 119 fully passes into the channel 305, the wall 302 deflects back to an at-rest position to frictionally and rotationally trap the central section 119 within the channel 305.

Figure 6:
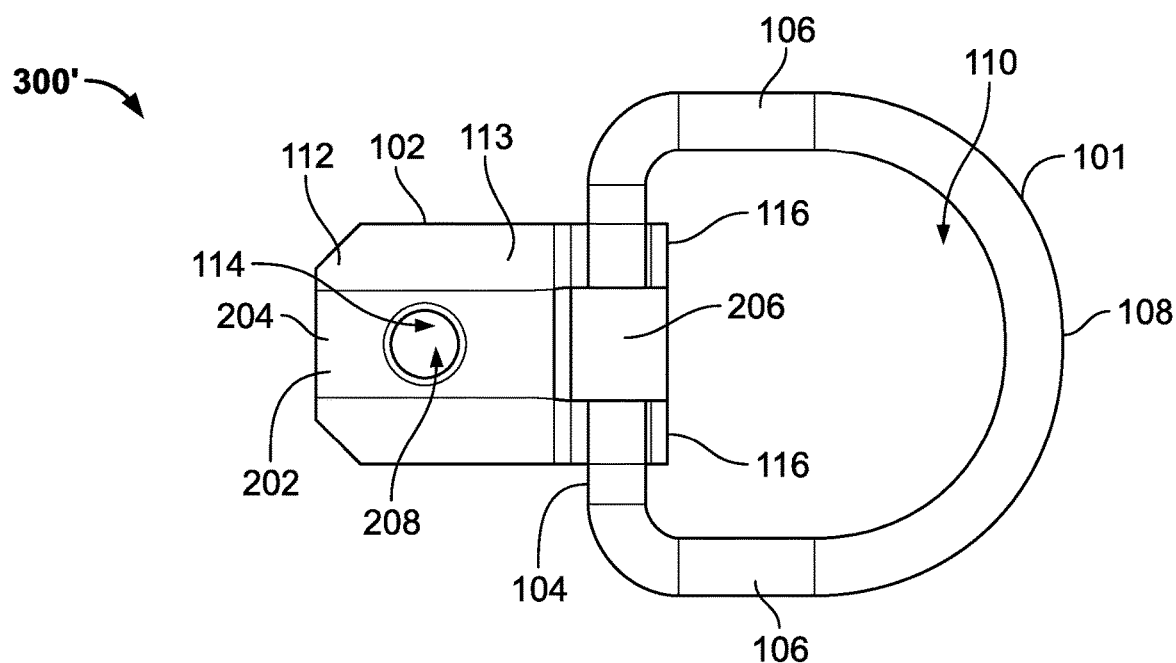
FIG. 6 illustrates a top plan view of a different embodiment of a tie down assembly.
Figure 7:
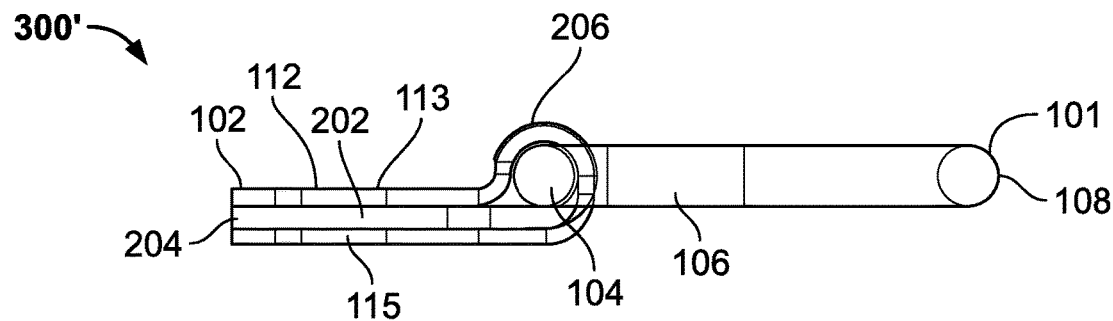
FIG. 7 illustrates a lateral view of the tie down assembly of FIG. 6.

FIGS. 6 and 7 illustrate still another embodiment of a tie down assembly 300', which includes the base 204 of the support coupler 202 sandwiched, or otherwise provided between, aligned panels 113 and 115 of the securing plate 112. The ring engagement member 206 is similar to that described with respect to FIGS. 4 and 5. Optionally, the ring engagement member 206 may be similar to that described with respect to FIGS. 2 and 3.

Figure 8:
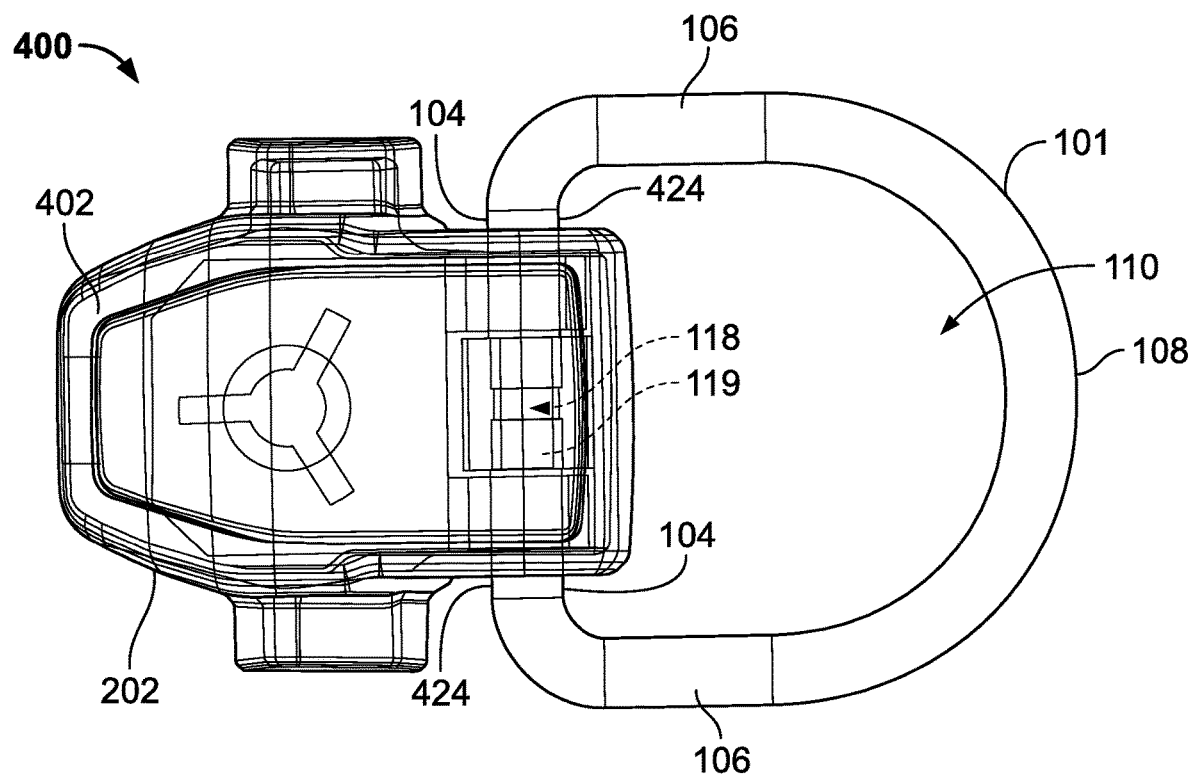
FIG. 8 illustrates a top plan view of another embodiment of a tie down assembly.
Figure 9:
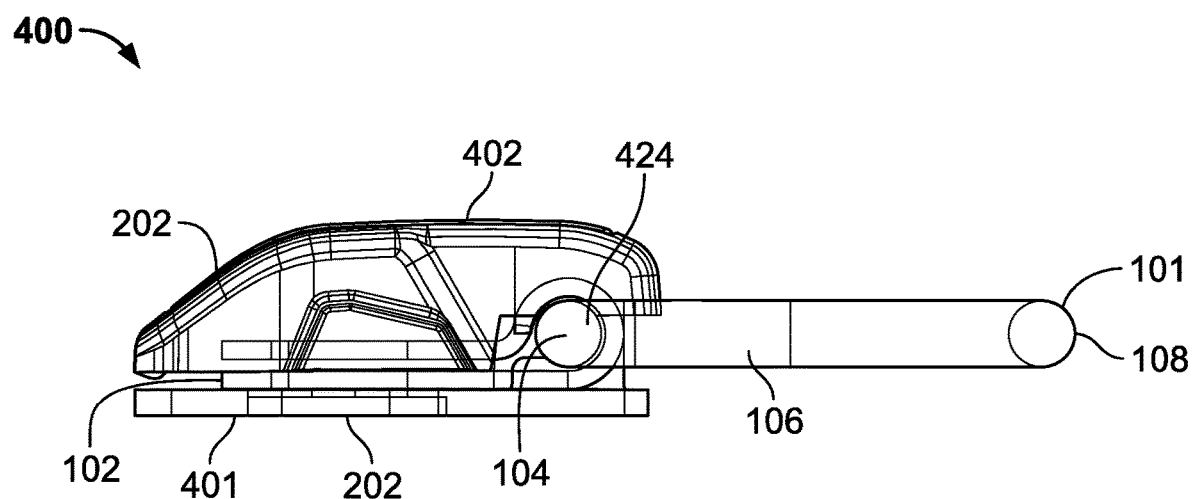
FIG. 9 illustrates a lateral view of the tie down assembly of FIG. 8.
Figure 10:
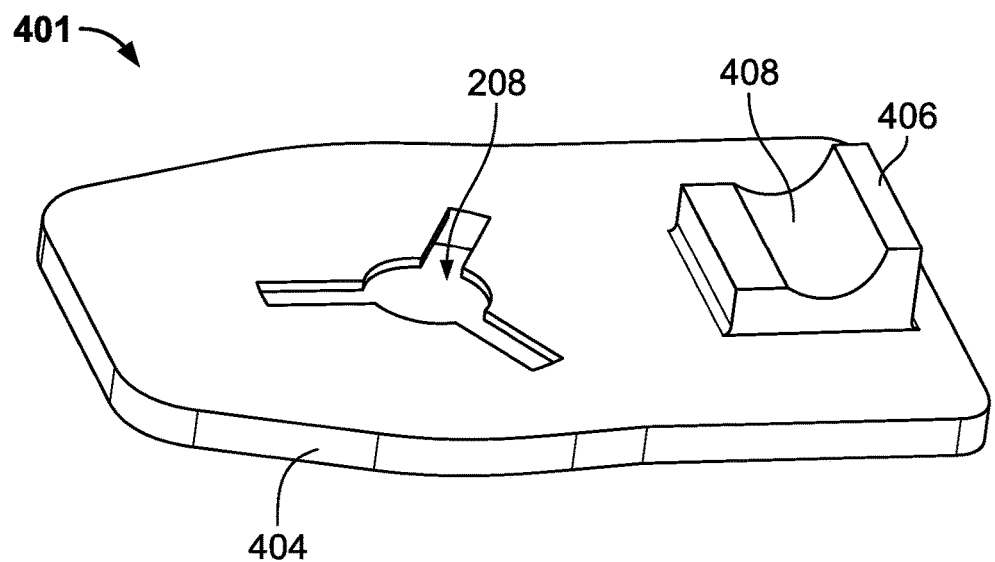
FIG. 10 illustrates a perspective top view of a lower cap of the tie down assembly of FIGS. 8 and 9.
Figure 11:
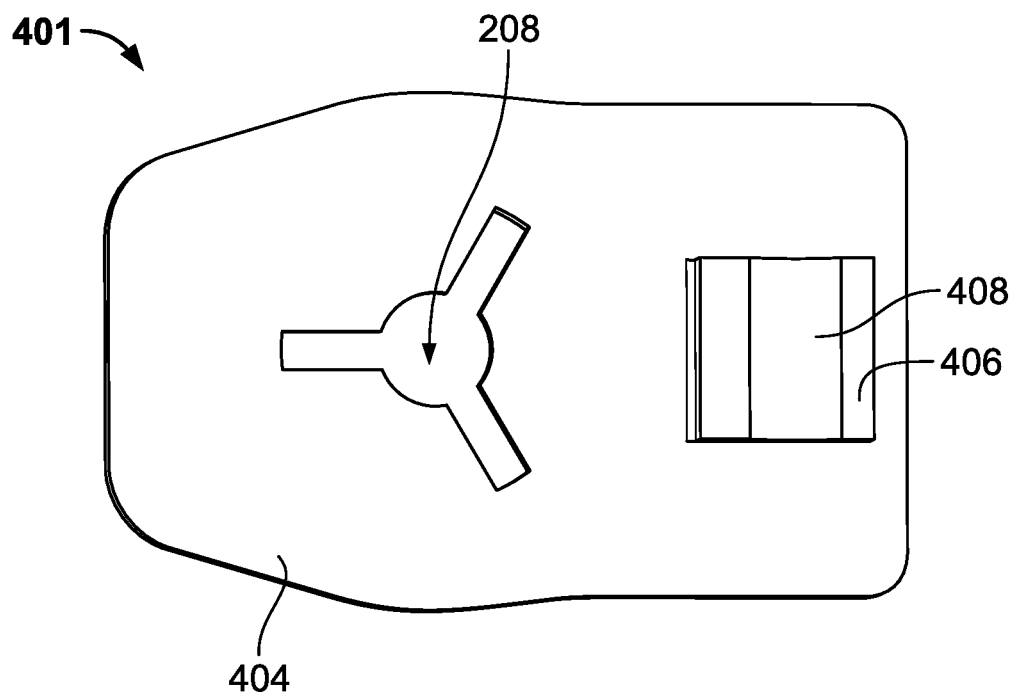
FIG. 11 illustrates a top plan view of the lower cap of FIG. 10.
Figure 12:
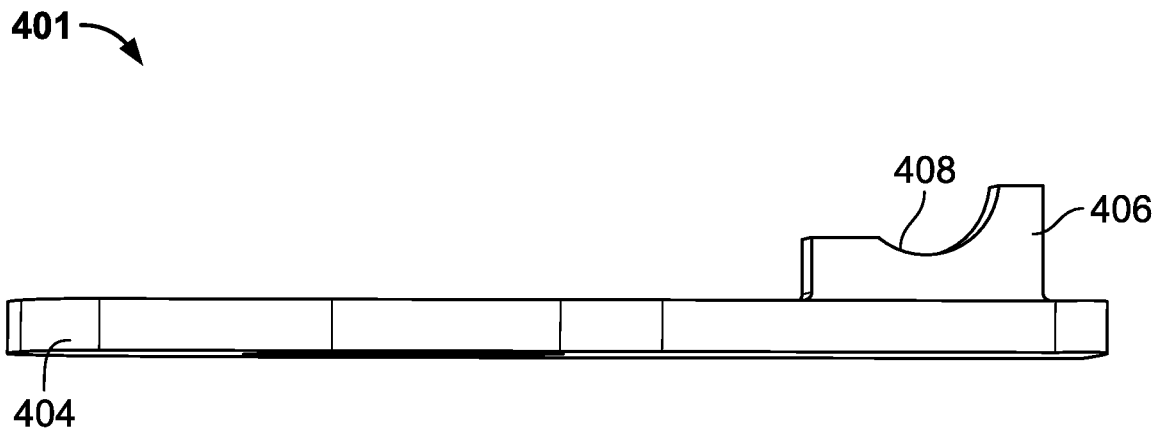
FIG. 12 illustrates a lateral view of the lower cap of FIG. 10.
Figure 13:
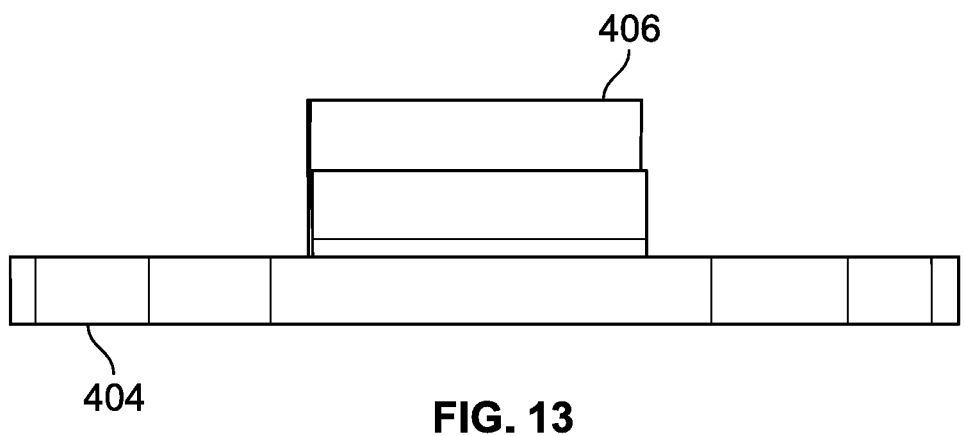
FIG. 13 illustrates a front view of the lower cap of FIG. 10.
Figure 14:
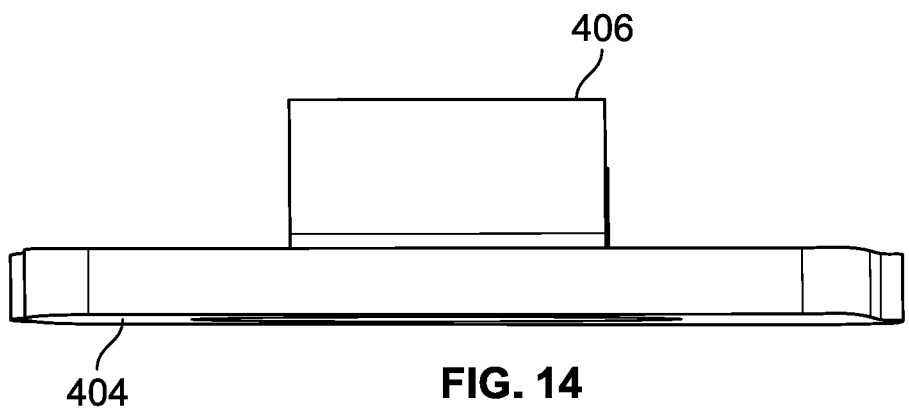
FIG. 14 illustrates a rear view of the lower cap of FIG. 10.
Figure 15:
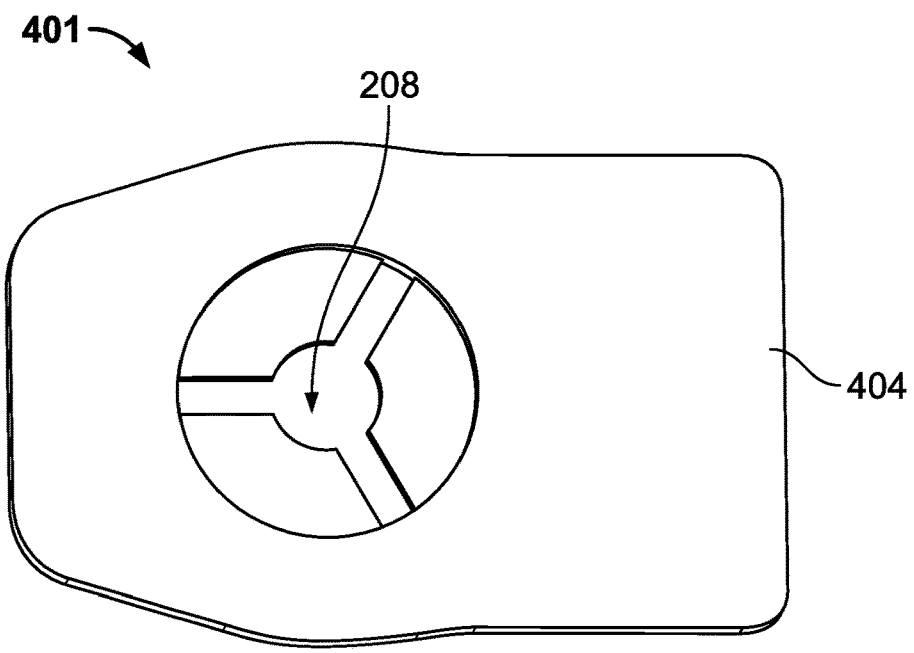
FIG. 15 illustrates a bottom view of the lower cap of FIG. 10.
Figure 16:
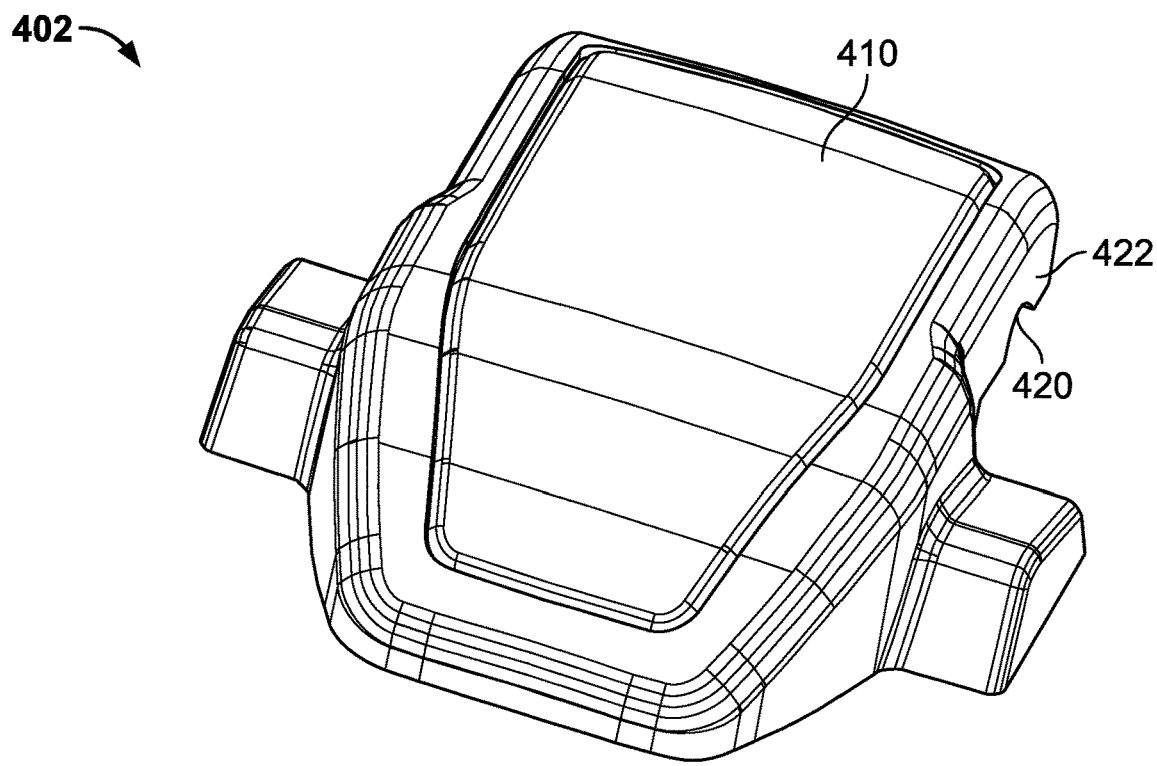
FIG. 16 illustrates a perspective top view of an upper cap of the tie down assembly of FIGS. 8 and 9.
Figure 17:
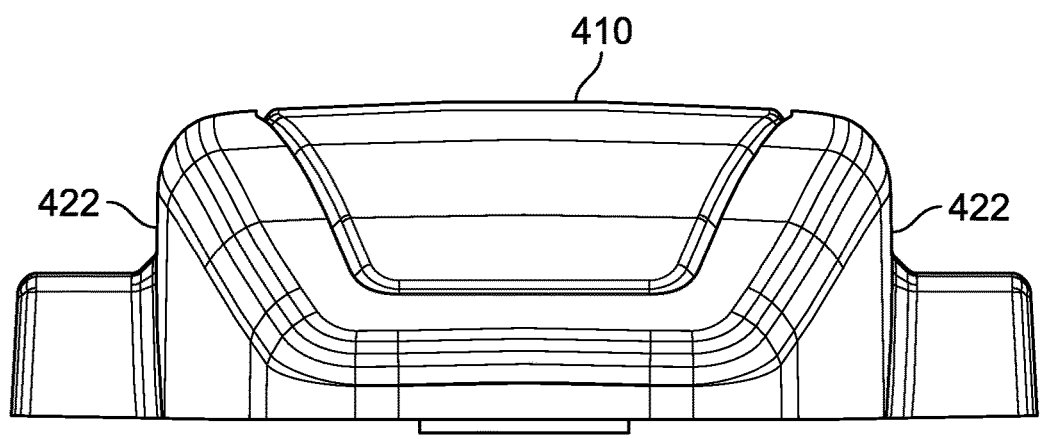
FIG. 17 illustrates a front view of the upper cap of FIG. 16.
Figure 18:
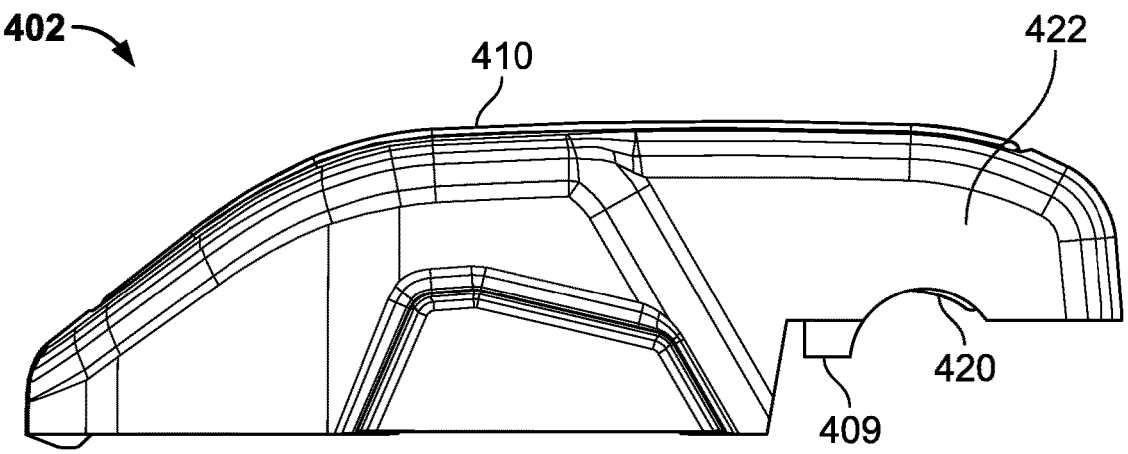
FIG. 18 illustrates a lateral view of the upper cap of FIG. 16.

Yet another embodiment is depicted in FIGS. 8 and 9, which illustrates a tie down assembly 400, which includes some aspects of the assembly shown in FIGS. 2 and 3. The tie down assembly 400 includes the support coupler 202 and a lower cap 401 underneath the clasp 102, and an upper cap 402 over the clasp 102. The lower cap 401 and the upper cap 402 may secure together, such as through a snap fit, and include internal portions that frictionally and rotationally trap the central section 119 of the pivot beam 104 therebetween. Optionally, the lower cap 401 and the upper cap 402 may secure to the clasp 102, instead of one another. In at least one embodiment, the lower cap 401 and the upper cap 402 may secure to each other and/or the clasp 102 through adhesives or fasteners.

Referring to FIGS. 10-15, the lower cap 401 includes a planar base 404 that underlies the clasp 102 (shown in FIGS. 8 and 9). A first ring engagement member 406 extends upwardly from the base 404. The first ring engagement member 406 includes an arcuate channel 408 that is sized and shaped to conform to an outer surface of the central section 119 of the pivot beam 104 (shown in FIG. 8). The first ring engagement member 406 of the lower cap 401 cooperate with a second ring engagement member 409 of the upper cap 402 (shown in FIG. 19), described below, to frictionally and rotatably trap the central section 119 of the pivot beam 104 (shown in FIG. 8) therebetween.

Figure 19:
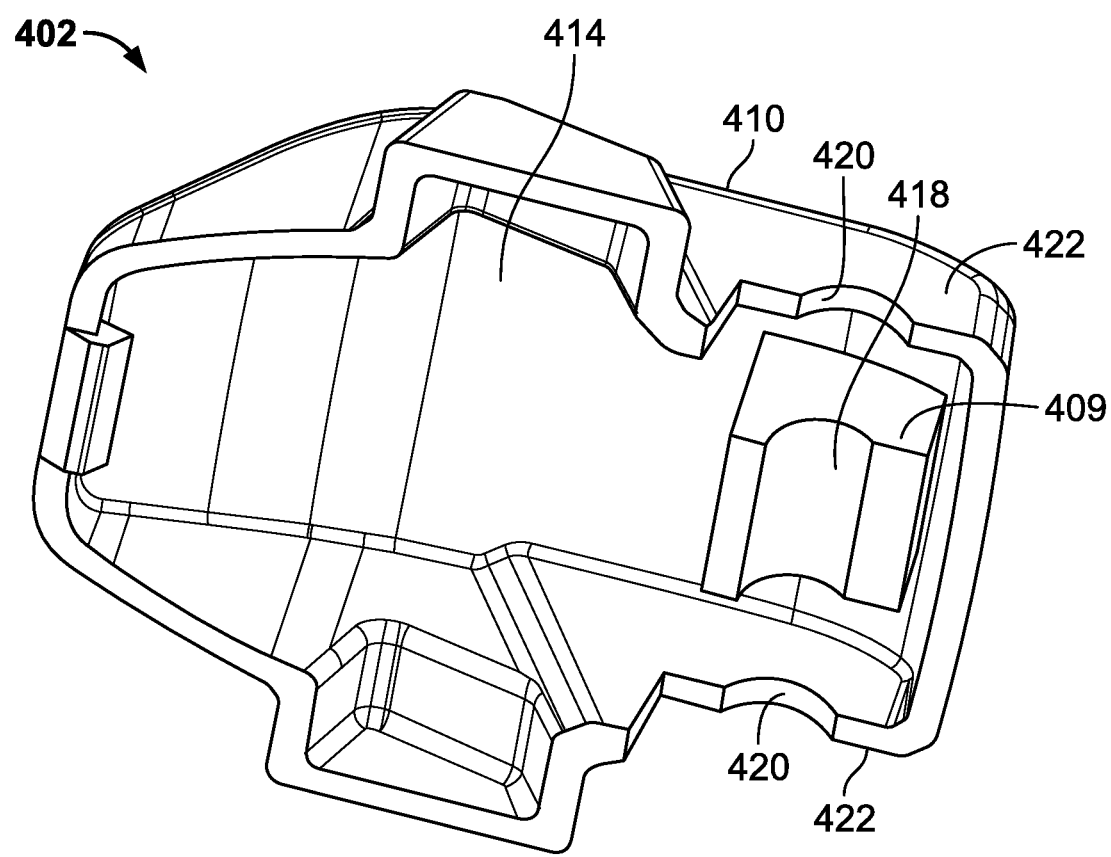
FIG. 19 illustrates a perspective bottom view of the upper cap of FIG. 16.
Figure 20:
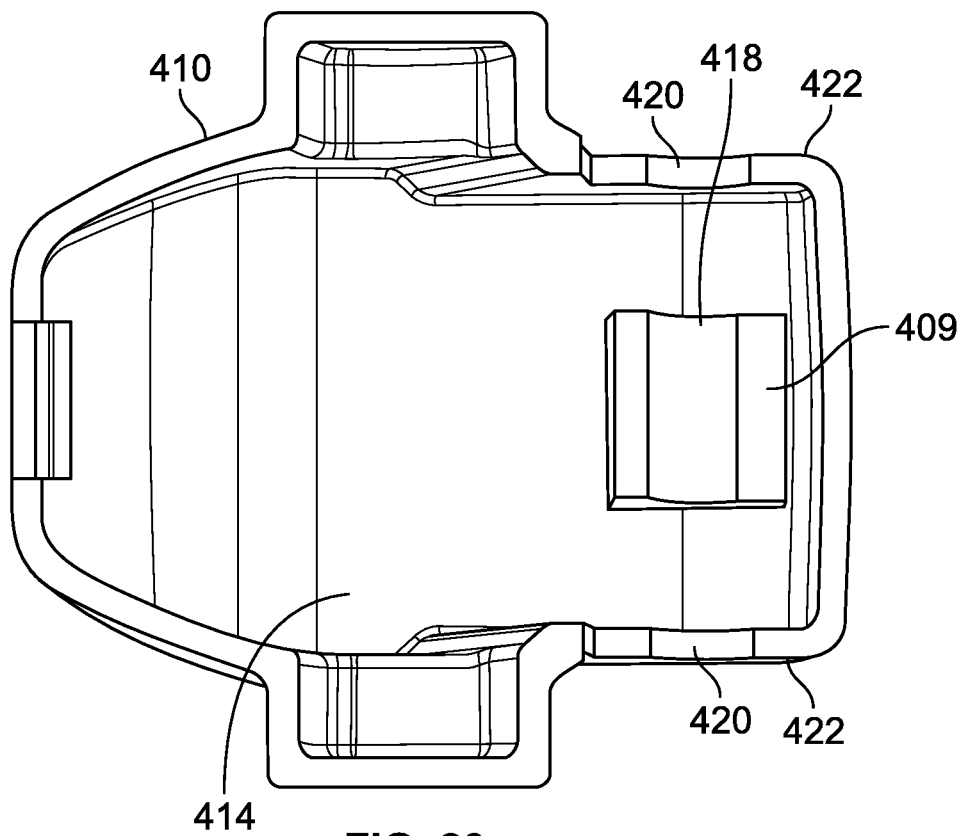
FIG. 20 illustrates a bottom view of the upper cap of FIG. 16.
Figure 21:
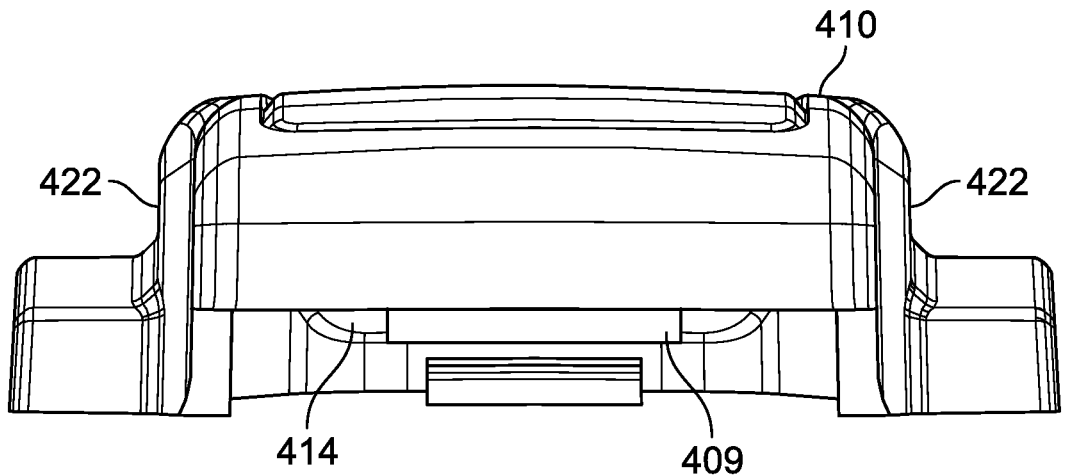
FIG. 21 illustrates a rear view of the upper cap of FIG. 16.
Figure 22:
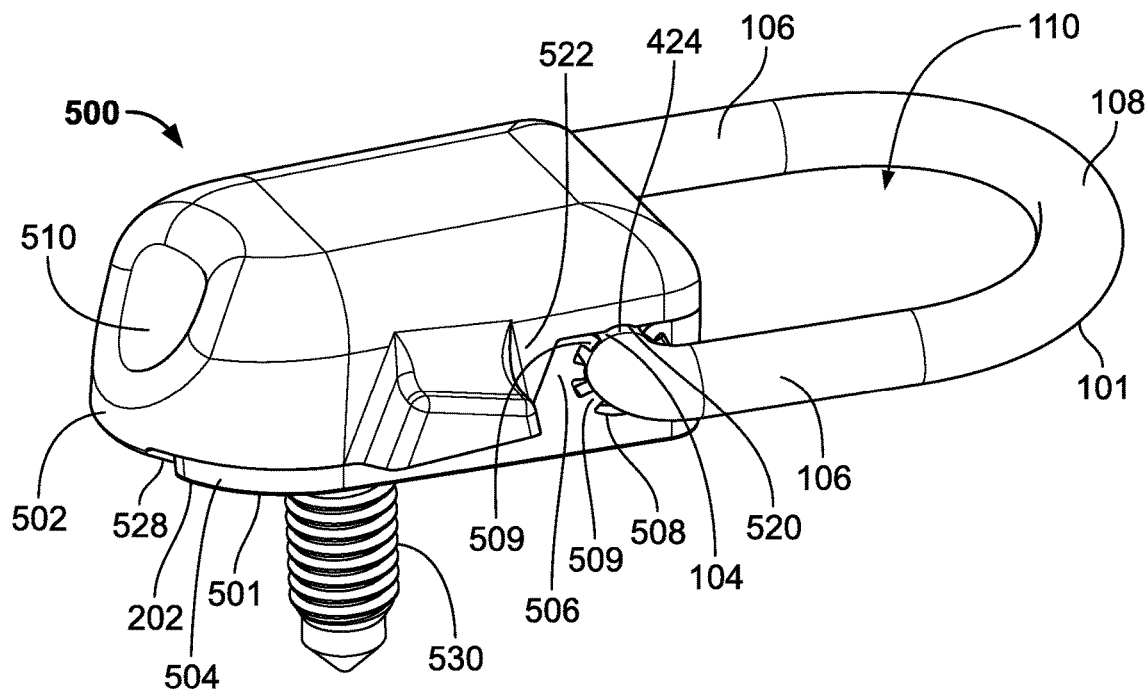
FIG. 22 illustrates a perspective top view of a tie down assembly, according to a different embodiment of the present disclosure.

Referring to FIGS. 16-21, the upper cap 402 includes a cover 410 that fits over the clasp 102 (shown in FIGS. 8 and 9). As shown in FIGS. 19 and 20, in particular, the second ring engagement member 409 extends downwardly from an interior surface 414 of the cover 410. The second ring engagement member 409 includes an arcuate channel 418 that is sized and shaped to conform to an outer surface of the central section 119 of the pivot beam 104 (shown in FIG. 8). The second ring engagement member 409 of the upper cap 402 cooperates with the first ring engagement member 406 of the lower cap 401 to frictionally and rotationally trap the central section 119 of the pivot beam 104 therebetween.

Additionally, the cover 410 includes arcuate recesses 420 formed in lateral walls 422 that are axially aligned with the channel 418. The recesses 420 are configured to fit over lateral portions 424 of the pivot beam 104 (as shown in FIGS. 8 and 9) to allow rotation of the ring 101. The recesses 420 may be sized and shaped to conform to the shape of the pivot beam 104. Edges of the lateral walls 422 that define the recesses 420 may frictionally engage the lateral portions 424 of the pivot beam 104 to provide additional frictional control. Alternatively, the lateral walls 422 may not include recesses, nor contact the pivot beam 104. In at least one other embodiment, the upper cap 402 may not include lateral walls 422 proximate to the pivot beam 104.

Referring to FIGS. 8-21, the lower cap 401 and the upper cap 402 may be sized and shaped differently than shown. In at least one embodiment, the lower cap 401 may include upstanding perimeter walls that extend upwardly toward the upper cap 402, which may include a planar cover and the ring engagement member 409.

With reference now to FIGS. 22-25, a tie down assembly 500 is depicted, in which similar structure noted in connection with the embodiments above is provided with the same reference numerals. With specific reference to FIGS. 22 and 23, the support coupler 202 includes a lower cap 501 underneath the clasp 102, and an upper cap 502 over the clasp 102. The lower cap 501 and the upper cap 502 may secure together, such as through a snap fit. Optionally, the lower cap 501 and the upper cap 502 may secure to the clasp 102, instead of one another. In at least one embodiment, the lower cap 501 and the upper cap 502 may secure to each other and/or the clasp 102 through adhesives or fasteners.

Figure 23:
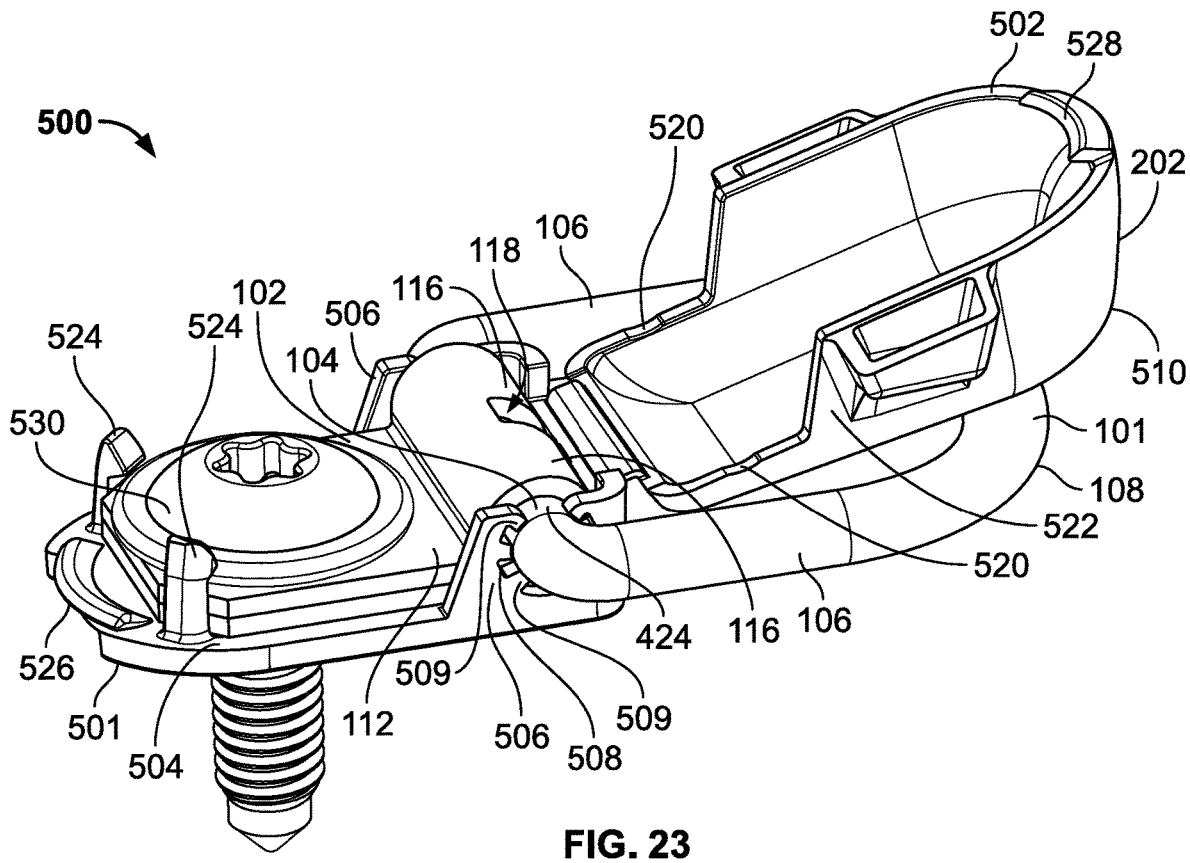
FIG. 23 illustrates another perspective top view of the tie down assembly of FIG. 22.
Figure 24:
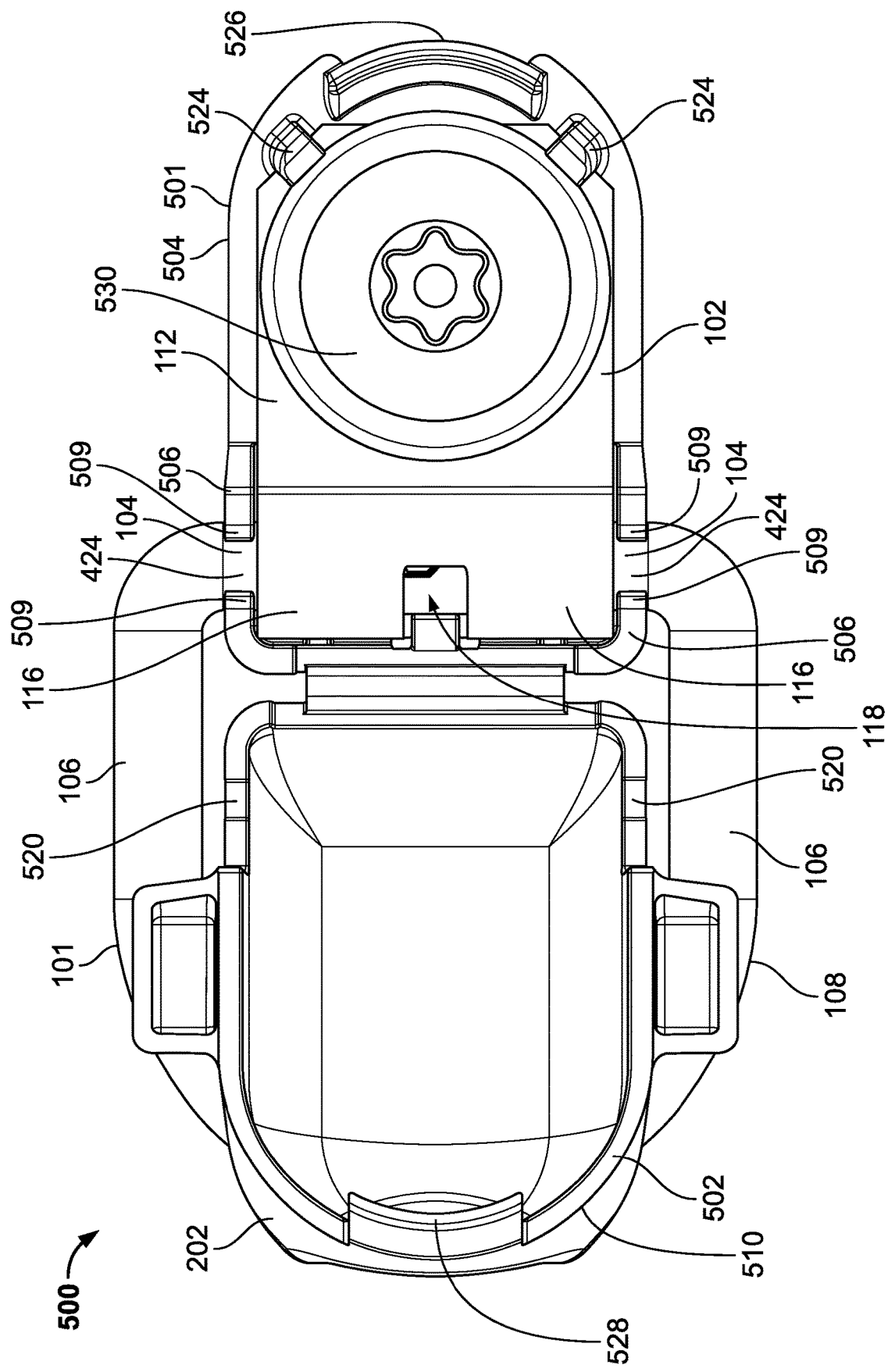
FIG. 24 illustrates a top plan view of the tie down assembly of FIG. 23.
Figure 25:
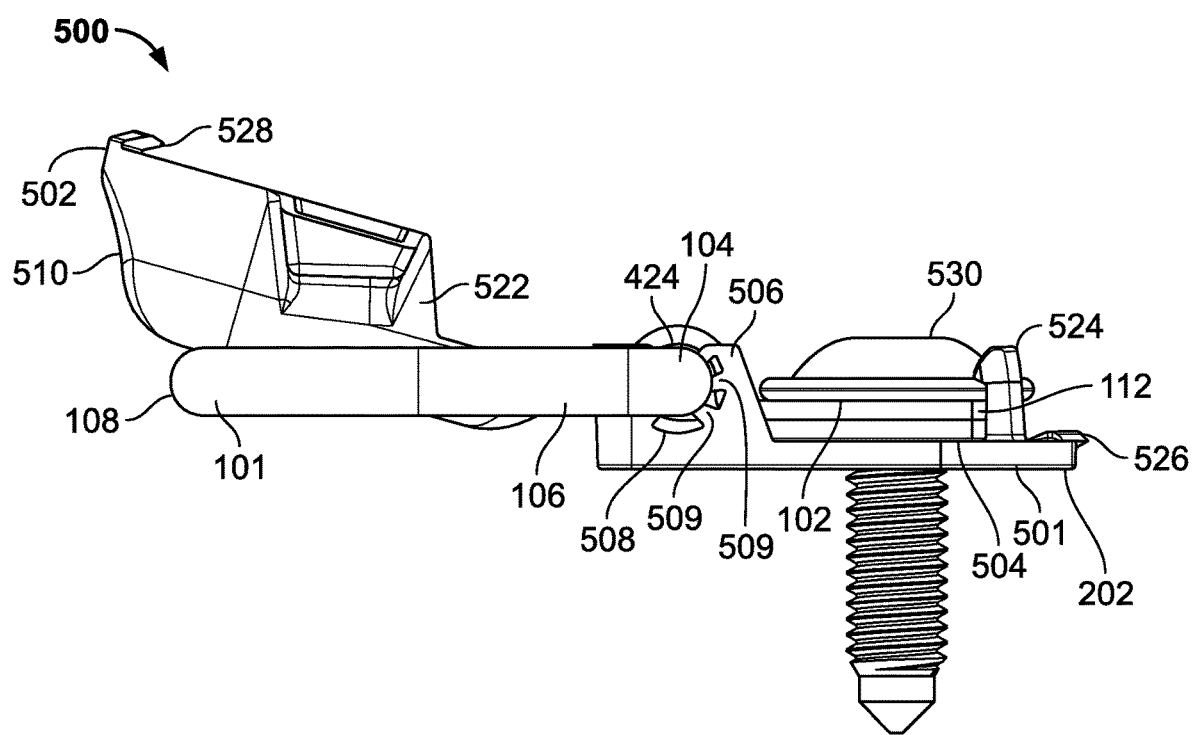
FIG. 25 illustrates a lateral view of the tie down assembly of FIG. 23.

With reference to FIGS. 23-25, the lower cap 501 includes a planar base 504 that underlies the clasp 102. Ring engagement members 506 extend upwardly from both sides of the planar base 504 and include an arcuate channel 508 that is sized and shaped to conform to an outer surface of the lateral portions 424 of the pivot beam 104. The arcuate channels 508 may include a plurality of protrusions 509 that extend radially around the channels 508 and contact with the lateral portions 424 of the pivot beam 104. The protrusions 509 further secure the pivot beam 104 to the support coupler 202. The arcuate channels 508 and protrusions 509 help to prevent abnormal noise during use of the tie down assembly 500.

With reference to FIGS. 22-25, the upper cap 502 includes a cover 510 that fits over the clasp 102 and helps secure the pivot beam 104 in place through arcuate recesses 520 formed in lateral walls 522 of the cover 510. The arcuate recesses 520 cooperates with the ring engagement members 506 to frictionally and rotationally trap the lateral portions 424 of the pivot beam 104 therebetween. Alternatively, the lateral walls 522 of the upper cap 502 may not include recess 520, nor contact the pivot beam 104. In at least one other embodiment, the upper cap 502 may not include lateral walls 522 proximate to the pivot beam 104.

With reference still to FIGS. 22-25, the lower cap 501 further includes hooks 524 that extend upwardly from the planar base 504. The hooks 524 are used to further secure the clasp 102 to the planar base 504. In an alternative embodiment, the planar base 504 can include a greater or fewer number of hooks 524 such that the clasp 102 is securely positioned. A lower flange 526 is positioned adjacent to the hooks 524 and cooperates with an upper flange 528 positioned on the lateral walls 522 of the cover 510. The lower and upper flanges 526, 528, respectfully, are used to securely lock the lower cap 501 to the upper cap 502, sealing the tie down assembly 500 (shown in FIG. 22).

The aligned through-hole 208 and the through-hole 114 (shown in FIG. 2) of the securing plate 112 are configured to receive a fastener 530, in order to securely fix the tie down assembly 500 to a structure, such as an interior portion of a trunk, a rear portion of an interior cabin, a closed or open cargo area, or roof of a vehicle. Because the base 504 underlies the clasp 102, the base 504 of the tie down assembly 500 directly contacts the structure, instead of the clasp 102.

With reference to FIGS. 23-25, the lower cap 501 and the upper cap 502 may be sized and shaped differently than shown. In at least one embodiment, the lower cap 501 may include upstanding perimeter walls that extend upwardly toward the upper cap 502, which may include a planar cover and the ring engagement member 506.

Referring to FIGS. 1-25, embodiments of the present disclosure provide a tie down assembly 200, 300, 300', 400, 500 that includes the ring 101 coupled to the clasp 102 and the support coupler 202. The support coupler 202 includes at least one ring engagement member 206, 406, 409, and/or 506 that is configured to frictionally engage a portion of the ring 101, such as the central section 119 or lateral portions 424 of the pivot beam 104. The support coupler 202 provides increased rotational control of the ring 101, and eliminates, minimizes, or otherwise reduces rattling of the ring 101 relative to the clasp 102. Additionally, a clearance fit may exist between the lateral prongs 116 and the pivot beam 104 to solve the problem of fixed metal ring rotation.

In at least one embodiment, the ring 101 and the clasp 102 are formed of one or more metals, while the support coupler 202 is formed of plastic. The ring 101 and the clasp 102 may first be secured together, after which the support coupler 202, which includes at least one ring engagement member 206, 406, 409, and/or 506, is secured to the clasp 102 and the ring 101 to form the tie down assembly 200, 300, 300', 400, 500. The metal clasp 102 coupled to the metal ring 101 provides robustness and strength to the tie down assembly 200, 300, 300', 400, 500, while the softer, more pliant support coupler 202 (formed of plastic, for example) provides frictional control of rotation of the ring 101 in relation to the clasp 102.

As described herein, embodiments of the present disclosure provide tie down assemblies that frictionally control rotation of a ring. Further, the tie down assemblies provide consistent rotational operation whether or not there are manufacturing variations in relation to clasps and rings. Also, the tie down assemblies eliminate, minimize, or other reduce undesired noise (for example, rattling).

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

Variations and modifications of the foregoing are within the scope of the present disclosure. It is understood that the embodiments disclosed and defined herein extend to all alternative combinations of two or more of the individual features mentioned or evident from the text and/or drawings. All of these different combinations constitute various alternative aspects of the present disclosure. The claims are to be construed to include alternative embodiments to the extent permitted by the prior art.

Various features of the disclosure are set forth in the following claims.

The invention claimed is:

1. A tie down assembly, comprising:
a clasp comprising a securing plate, wherein the securing plate comprises two panels;
a ring rotatably coupled to the clasp; and
a support coupler that is coupled to the ring, wherein the support coupler frictionally controls rotation of the ring with respect to the clasp, and wherein the support coupler comprises a base that underlies at least one of the panels of the securing plate.

2. The tie down assembly of claim 1, wherein the clasp and the ring are formed of one or more metals, and wherein the support coupler is formed of a material that is softer than the clasp and the ring.

3. The tie down assembly of claim 2, wherein the material is a plastic.

4. The tie down assembly of claim 1, wherein the clasp comprises lateral prongs extending from the securing plate, the lateral prongs being separated by a gap, wherein each of the lateral prongs defines a channel through which a portion of the ring is positioned.

5. The tie down assembly of claim 4, wherein a portion of the support coupler couples to the ring within the gap.

6. The tie down assembly of claim 1, wherein the support coupler comprises a ring engagement member that frictionally couples to a portion of the ring.

7. The tie down assembly of claim 6, wherein the ring engagement member comprises resilient clips extending from the base.

8. The tie down assembly of claim 6, wherein the ring engagement member comprises a C-shaped sleeve including an arcuate wall and an open end.

9. The tie down assembly of claim 1, wherein the base of the support coupler is provided between the two panels of the securing plate of the clasp.

10. The tie down assembly of claim 1, wherein the base of the support coupler is a lower cap underneath the clasp, and wherein the support coupler further comprises an upper cap over the clasp.

11. The tie down assembly of claim 10, wherein the lower cap comprises a first ring engagement member, and the upper cap comprises a second ring engagement member, wherein the first ring engagement member cooperates with the second ring engagement member to frictionally and rotationally trap a portion of the ring therebetween.

12. A tie down assembly, comprising:
a clasp including a securing plate, and lateral prongs extending from the securing plate, the lateral prongs being separated by a gap, wherein each of the lateral prongs defines a channel;
a ring that is rotatably coupled to the clasp, wherein a first portion of the ring is positioned within the channels of the lateral prongs, wherein the clasp and the ring are formed of one or more metals; and
a support coupler that is coupled to the ring within the gap, wherein the support coupler is formed of plastic, wherein the support coupler frictionally controls rotation of the ring with respect to the clasp, the support coupler comprising at least one ring engagement member that frictionally couples to a second portion of the ring,
wherein the support coupler further comprises a base that underlies a portion of the securing plate.

13. The tie down assembly of claim 12, wherein the at least one ring engagement member comprises resilient clips extending from the base.

14. The tie down assembly of claim 12, wherein the at least one ring engagement member comprises a C-shaped sleeve including an arcuate wall and an open end.

15. The tie down assembly of claim 12, wherein the base of the support coupler is provided between aligned panels of the securing plate of the clasp.

16. The tie down assembly of claim 12, wherein the base of the support coupler is a lower cap underneath the clasp, and wherein the support coupler further comprises an upper cap over the clasp.

17. The tie down assembly of claim 16, wherein the lower cap comprises a first ring engagement member, and the upper cap comprises a second ring engagement member, wherein the first ring engagement member cooperates with the second ring engagement member to frictionally and rotationally trap a portion of the ring therebetween.

18. A tie down assembly, comprising:
a clasp including a securing plate, and lateral prongs extending from the securing plate, the lateral prongs being separated by a gap, wherein each of the lateral prongs defines a channel;
a ring that is rotatably coupled to the clasp, wherein a first portion of the ring is positioned within the channels of the lateral prongs; and
a support coupler that is coupled to the ring within the gap, wherein the support coupler frictionally controls rotation of the ring with respect to the clasp, the support coupler comprising at least one ring engagement member that frictionally couples to a second portion of the ring,
wherein the at least one ring engagement member comprises resilient clips extending from a base of the support coupler.

19. The tie down assembly of claim 18, wherein the clasp and the ring are formed of one or more metals, and wherein the support coupler is formed of a material that is softer than the clasp and the ring.

20. The tie down assembly of claim 18, wherein the support coupler base underlies the securing plate.

\* \* \* \* \*